W. KILLINGSWORTH.
MACHINE FOR SNIPPING BEANS AND OTHER ARTICLES.
APPLICATION FILED JULY 2, 1917.
1,256,023. Patented Feb. 12, 1918.
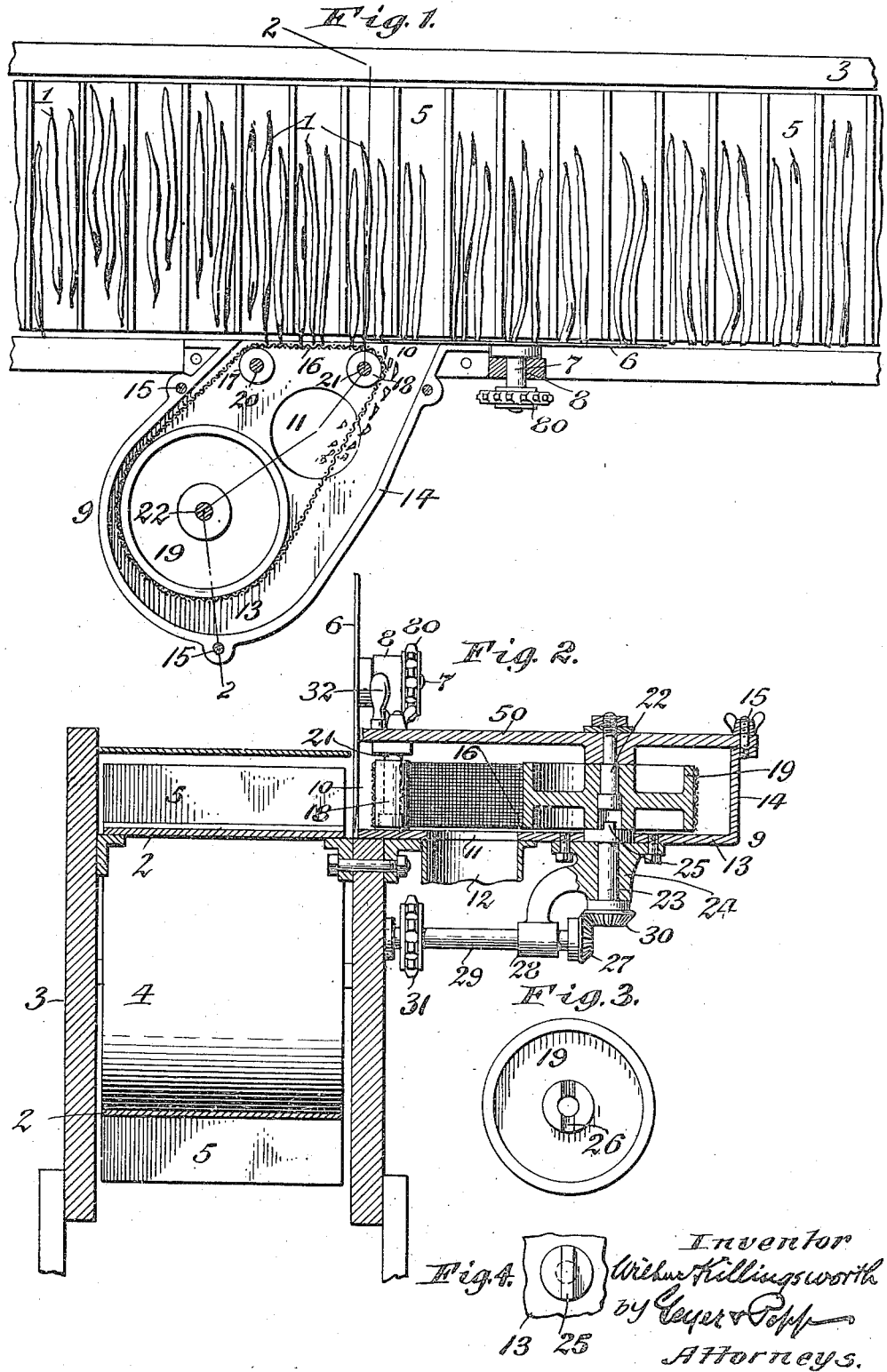

UNITED STATES PATENT OFFICE.

WILBUR KILLINGSWORTH, OF CHILLICOTHE, OHIO, ASSIGNOR TO THE CHILLICOTHE BEAN SNIPPER COMPANY, OF CHILLICOTHE, OHIO, A CORPORATION OF OHIO.

MACHINE FOR SNIPPING BEANS AND OTHER ARTICLES.

1,256,023.      Specification of Letters Patent.      Patented Feb. 12, 1918.

Application filed July 2, 1917. Serial No. 178,064.

*To all whom it may concern:*

Be it known that I, WILBUR KILLINGSWORTH, a citizen of the United States, residing at Chillicothe, in the county of Ross and State of Ohio, have invented new and useful Improvements in Machines for Snipping Beans and other Articles, of which the following is a specification.

This invention relates to a machine for snipping, trimming or cutting off the ends of string beans or similar articles preparatory to cooking the same and packing them for future use as is commonly done on a large scale in canning factories.

In machines of this character, as heretofore constructed, the beans to be trimmed were usually moved transversely by air pressure against a gage consisting of a plurality of wheels preparatory to being moved past the cutter which trims off the ends of the beans. This manner of gaging the beans is objectionable inasmuch as it results in considerable waste of the smaller beans which are of the greatest value. It is the object of this invention to provide a gage for machines of this character in which small articles can be cut off at the ends as economically as larger articles and save a greater amount of such small articles particularly in the case of small beans.

In the accompanying drawings:

Figure 1 is a fragmentary top plan view, partly in section, showing my improvements embodied in a machine for snipping off or trimming the ends of string beans. Fig. 2 is a fragmentary vertical transverse section of the same taken on the correspondingly numbered line in Fig. 1. Fig. 3 is a bottom plan view of the driving pulley around which the gage belt of the machine passes. Fig. 4 is a top plan view of one part of the coupling whereby the driving pulley of the gage belt is connected with its driving shaft.

Similar characters of reference indicate corresponding parts throughout the several views.

Although my invention may be applied to various kinds of machines for trimming off the ends of articles, such as beans or the like, the same is represented in the drawings as embodied in a machine for trimming or snipping beans. As there shown, the beans 1 to be trimmed are propelled past the gaging and cutting mechanism by means of a carrier or propeller comprising an endless belt or apron 2 which has an upper horizontal operative stretch and a lower horizontal inoperative stretch and passes with its opposite turns around supporting pulleys which are mounted on a main frame 3, only one of these pulleys 4 being shown in the drawings. On its outer side this apron is provided with a plurality of transverse pockets or buckets 5 in which the beans to be trimmed are placed in a crosswise position relative to the direction of movement of the belt while these pockets are on the upper stretch of the same.

At one side of the path of the article carrier is arranged the cutter whereby the ends of the beans which project beyond one side of the pockets are trimmed or cut off, this cutter in the present instance being in the form of a disk-shaped rotary blade 6 which is arranged vertically on one side of the path of the carrier and mounted on a horizontal transverse shaft 7 which is journaled in a bearing 8 on the main frame and provided with a driven sprocket wheel 80 which receives a driving belt. This bean carrier and cutter blade may be operated in any suitable manner for instance by means similar to those shown in the application for Letters Patent filed by myself September 3, 1914, Serial #860,008.

My improved means for gaging the beans at their ends preparatory to presenting the same to the cutter are preferably constructed as follows:

In front of the cutter and adjacent to the corresponding ends of the buckets of the carrier is arranged a suction box 9 or chamber which is closed on its top and bottom and on its outer sides and is provided on its inner side which faces the corresponding ends of the carrying buckets with an inlet opening 10 and in its bottom with an outlet opening 11 which is connected by a tube 12 with an air exhausting device of any suitable character whereby an air current is caused to move crosswise through the carrier pockets as they pass the suction box, thence into the suction box and out through the outlet in the bottom thereof. This suction box may be variously constructed but in the preferred form the same comprises a lower section which is mounted on the main frame of the machine and consists of a horizontal bottom 13 and an upright wall 14 projecting upwardly from the margin of this bottom, and an upper section 50 forming a horizontal top or cover which is detachably secured to the upper edge of the wall by means of screws or bolts 15, as shown in Fig. 2. Within this box is arranged a gage belt 16 which is constructed of foraminous material such as woven wire cloth. This belt passes with its inner part around two upright guide rollers 17, 18 arranged within the suction box adjacent to its inlet and at different points in the length thereof while its outer part passes around a driving pulley 19 arranged in the outer part of the suction box so as to present a substantially straight portion of this gage belt between the two guide rollers which straight portion is arranged upright and parallel with the line of movement of the carrying pockets and adjacent to the corresponding ends of the latter. These guide rollers are mounted on upright pivot pins 20, 21 which are secured to the top of the suction box and the driving pulley 19 is preferably mounted on a vertical arbor 22 depending from the top or cover of the suction box.

Various means may be provided for turning the driving pulley so as to cause that part of the gage belt adjacent to the carrying buckets to travel in the same direction and at the same speed as the buckets. The means for this purpose which are shown in the drawings comprise an upright driving shaft 23 which is journaled in a bearing 24 on the underside of the suction box and adapted to be detachably connected with the driving pulley by a coupling which preferably consists of a transverse key or tongue 25 arranged on the upper end of the driving shaft and engaging with a transverse groove 26 in the lower end of the hub of the driving pulley, as shown in Figs. 2, 3 and 4. The driving shaft may be driven by any suitable means, for instance by a horizontal shaft 29 journaled transversely in bearings 28 on the main frame and provided at one end with a bevel gear 27 which meshes with a bevel gear 30 at the lower end of the driving shaft, and a sprocket wheel 31 adapted to receive a driving sprocket chain.

The outlet of the suction box is preferably arranged partly below the space within the boundaries of the gage belt and also partly outside of the boundaries of this belt adjacent to the rear stretch thereof extending from the rear supporting roller 18 to the driving pulley, as shown in Fig. 1.

In the operation of this machine the carrying buckets move continuously forward past the gage and cutter mechanisms and the beans to be trimmed are delivered a few at a time in each of the pockets before they reach these mechanisms. As the pockets come successively into line with the inlet of the suction box the beans therein are moved bodily across the respective bucket or buckets until the corresponding ends thereof engage with the straight portion of the gage belt which is arranged across the respective end of the bucket, thereby positioning the beans so that the end portions thereof project slightly beyond the corresponding end of the bucket. During the continued forward movement of the beans while in engagement with the gage belt the latter moves forwardly at the same rate as the carrying buckets and then the beans while still in their gaged position are presented to the cutter blade which operates to sever or cut off the ends of the beans on a line between the gage belt and the corresponding sides of the buckets. The beans are drawn tightly against that portion of the gage belt between the two guide rollers 17, 18 owing to the suction which is produced within the boundaries of this belt and the snips or ends of the beans which are removed from the bodies thereof by the cutter are carried by the air current into the suction box adjacent to the rear part of its inlet and then discharged through the outlet of the box by the suction device connected therewith and delivered to a suitable place provided for that purpose.

As the gage belt moves constantly in unison with the bean carrier new parts of the gage belt are constantly presented to successive carrying buckets whereby a continuous gage surface is provided for the string beans in successive pockets or buckets as they approach the gaging and cutting position.

Owing to the minute openings of the gage belt which are presented to the beans the ends of the latter may be firmly drawn against the gage belt by the air current passing inwardly through the same without, however, permitting any part of the body or meaty portion of the beans from being drawn into the openings of the belt, whereby the beans are retained in the proper position for subsequent trimming by the cutter blade without trimming off any more than the extreme ends of the beans, thereby preventing loss of the valuable parts of the beans as would otherwise be liable to occur.

It therefore follows that this machine will not only successively snip or trim the ends of large beans but will also properly snip or trim the ends of small beans without cutting off an undue amount of the body or meaty portion of the small beans and also without liability of losing the bodies of the small beans which are of the greatest value. This machine therefore enables beans to be snipped more efficiently and economically than has been possible heretofore and insures a larger profit in its operation.

When it is desired to clean, adjust, inspect or repair any of the parts within the suction box, this can be readily done by loosening the screws or bolts 15 and then lifting the cover or upper section from the lower section of the suction box, whereby the guide rollers and driving pulley mounted on this cover together with the gage belt passing around the same may be removed from the suction box.

While thus removing the driving pulley from the suction box the same will be uncoupled from the driving shaft and upon restoring the parts this driving connection between the driving pulley and the driving shaft may be again reëstablished. By this means the operation of inspecting, cleaning and repairing can be effected quickly and easily and without disarranging the driving connection between the gage belt and its shaft. For convenience in lifting the cover the same is preferably provided with the handle, as shown at 32.

My improved means for gaging the string beans preparatory to snipping or trimming the same at their ends are very simple in construction and not liable to get out of order and the same permit of effectively and economically performing this operation without any waste of the valuable parts of the beans.

I claim as my invention:

1. A machine for cutting the ends of articles comprising a cutter, a carrier for moving the articles to be cut past said cutter, and a gage device for positioning said articles preparatory to reaching said cutter comprising a foraminous gage arranged in front of said cutter, and means for moving said articles by fluid pressure crosswise of said carrier into engagement with said gage.

2. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof and means for moving said articles by fluid pressure crosswise of said carrier into engagement with said gage.

3. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof and moving in unison therewith, and means for moving said articles by fluid pressure crosswise of said carrier into engagement with said gage.

4. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof and rotating members on which said gage belt is supported, and means for moving said articles by fluid pressure crosswise of said carrier into engagement with said gage.

5. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof and an air suction box inclosing said belt and having an air inlet adjacent to said carrier and having an outlet adapted to be connected with an exhaust device.

6. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof, an air suction box inclosing said belt and having an air inlet adjacent to said carrier and having an outlet adapted to be connected with an exhaust device, two supporting rollers arranged adjacent to the inlet of said box and supporting the inner part of said belt and a driving wheel supporting the outer part of said belt.

7. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof, an air suction box inclosing said belt and having an air inlet adjacent to said carrier and having an outlet adapted to be connected with an exhaust device, two supporting rollers arranged adjacent to the inlet of said box and supporting the inner part of said belt and a driving wheel supporting the outer part of said belt, said suction box comprising a fixed lower section, and an upper section detachably connected with said lower section and carrying said rollers and pulley.

8. A machine for cutting the ends of articles comprising a cutter, a carrier for moving the articles to be cut past said cutter, and a gage device for positioning said articles preparatory to reaching said cutter comprising a foraminous gage belt having a part arranged lengthwise of said carrier on one side thereof, an air suction box inclosing said belt and having an air inlet adjacent to said carrier and having an outlet adapted to be connected with an exhaust device and comprising a fixed lower section and an upper section detachably connected with said lower section, guide rollers pivoted on the inner part of said upper section and supporting said belt adjacent to said inlet, a driving pulley pivoted on said upper section and supporting the outer part of said belt, a driving shaft journaled on said lower section, and a coupling detachably connecting said shaft and pulley.

WILBUR KILLINGSWORTH.

Copies of this patent may be obtained for five cents each, by addressing the "Commissioner of Patents, Washington, D. C."